3,134,722
MOUNTING DEVICE FOR FUEL ELEMENT ASSEMBLIES IN A NUCLEAR REACTOR

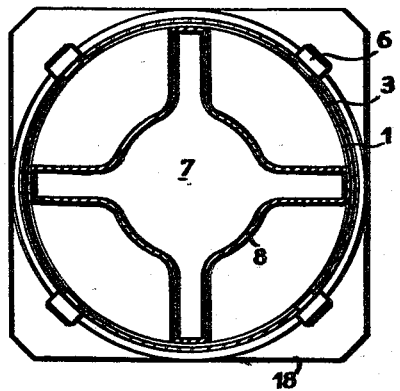
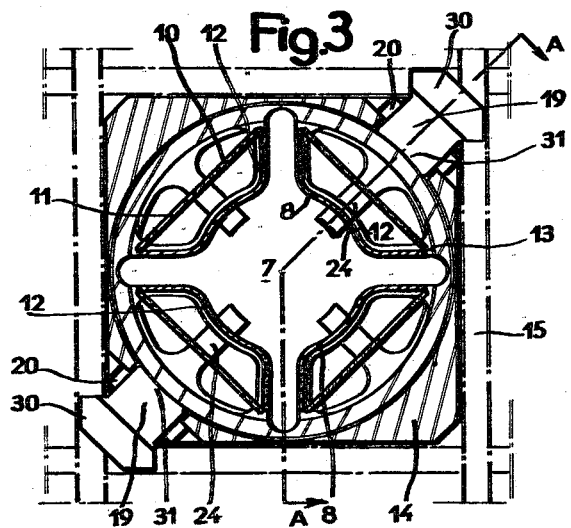

Claude Hespel, Limours, and Joseph Olivier, Clamart, France, assignors to Commissariat a l'Energie Atomique, Paris, France
Filed Oct. 3, 1961, Ser. No. 142,722
Claims priority, application France Oct. 14, 1960
5 Claims. (Cl. 176—40)

It is known that the core of a nuclear reactor can be the site of large variations in temperature and that expansions, which can be quite considerable, can occur in the materials constituting it. This must be taken into account, in particular, in connection with the mounting of fuel element assemblies. However, while allowing such expansions to occur freely, the mounting arrangement must be sufficiently rigid and robust, particularly in reactors which are required to suffer vibration, to have varied inclinations and even to withstand shock, such as marine propulsion reactors. Also, the mounting device used must permit ready introduction or withdrawal of each fuel element assembly, avoiding dismantling and manipulation as far as possible.

It is known to take up expansion by means of springs; this principle has been employed for mounting fuel element assemblies in numerous reactors, such as the United States reactors of the pressurised-water ("PWR") type, which have an upper spring for taking up expansion of the reflector housing the fuel elements and a lower spring for taking up differential expansion between the fuel and the reflector. This arrangement generally permits relatively simple manipulation, though the rigidity of the structure is not sufficient for effectively resisting axial shock.

A more rigid construction consists in terminating the fuel element assembly with two cruciform ferrules which penetrate into recesses of appropriate shape in the upper and lower grids. In this case, longitudinal expansion only occurs upwardly and a sufficient clearance must be provided. On the other hand, the shape of the recesses in the upper grid necessitates its dismantling for manipulation of the fuel.

The present invention relates to a mounting device for fuel element assemblies in a nuclear reactor, applicable in particular to pressurised reactors for marine propulsion, which device solves the above problems.

According to the invention, a mounting device for fuel element assemblies in a nuclear reactor is provided, comprising a head and a cylindrical guide tube, the head being located in a recess in the upper grid of the reactor and being provided at its upper part with a collar member forming an abutment, in which the head is of parallelepiped shape having a vertical axis, is machined along its axis and is provided at its lower part with apertures for receiving pawls pivoted about horizontal axes, and the cylindrical guide tube is partly introduced into the machined bore of the head and moves the pawls into contact with the lower edge of the recess, locking means being provided between the head and the guide tube and the ends of the fuel element can be secured by means of flanges to the lower part of the head and to a ferrule member freely slidable in a recess in the lower grid of the reactor.

The head is rigidly fixed to the upper grid; the collar member rests under gravity on the upper edges thereof and the pawls, held by the guide tube, rest against its lower edges. Expansion of the elements of the assembly occurs freely downwardly, the ferrule moving to a greater or lesser depth in the recess in the lower grid by reason of the slight frictional forces present. The introduction of fuel can take place without dismantling, other than of the cover of the tank. It is sufficient to withdraw the guide tube, which frees the pawls which pivot under gravity, and then to remove the fuel element assembly by its head, which is no longer secured. It will be understood that replacement occurs in the reverse manner.

Referring to the accompanying drawings, an embodiment is described below, by way of example, of a mounting device for fuel element assemblies in a nuclear reactor according to the invention. The features described in relation to this embodiment, which are applicable particularly, but not exclusively, to a pressurised water reactor intended in particular for marine propulsion, are to be considered as constituting part of the invention, it being understood that all equivalent arrangements can be used without exceeding the scope thereof.

Only those parts necessary for understanding the invention are shown in the drawings, corresponding parts in the various figures having the same references.

In the drawings:

FIG. 2 shows a sectional view on the line B—B of FIG. 1;

FIG. 3 shows a sectional view on the line C—C of FIG. 1;

Figure 1:
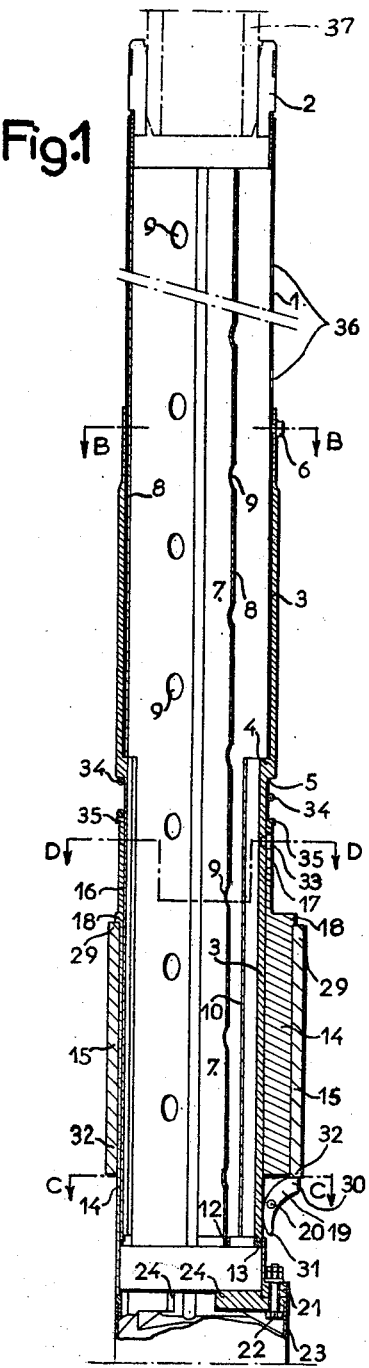
FIG. 1 shows a guide-tube and the head of a fuel element assembly of the invention, seen on the line A—A of FIG. 3.

The guide tube shown in section in FIG. 1 comprises a thin cylindrical sleeve 1, provided at its upper end with a fin assembly 2 for guiding the coolant fluid, which assembly 2 mates with a pipe 37 secured to the cover of the tank on closure of the latter. The lower part of the sleeve 1 is fitted into a sheath 3 by means of screws or rivets (not shown). The sheath is tubular, but its lower part has a smaller diameter than its upper part, while retaining substantially the same wall thickness. This change of diameter provides an internal shoulder 4, which serves as an abutment for the end of the sleeve 1, and an external shoulder 5, the purpose of which is explained below.

The sleeve/sheath unit 1, 3 includes four lugs, such as 6, for facilitating manipulation. Inside this unit, as best shown in FIGS. 2 and 3, a system for guiding a control rod is provided, comprising a cruciform channel 7, defined by thin walls 8 provided with apertures, such as 9, for passage of the coolant fluid. Below the shoulder 4 of the sheath 3, the walls 8 no longer form a complete cross and their rigidity is therefore increased by means of support plates 10 having apertures such as 11. Centering is ensured by means of projections 12 on an annulus 13 welded to the lower end of the sheath 3.

The head of the fuel element assembly, shown in section in FIG. 1, comprises a body part 14 of generally parallelepiped shape, having a rectangular cross-section identical with that of the recess in the upper grid 15 in which it is received, the part 14 being extended at its upper end as a cylindrical neck member 16. The head is machined to the smallest outside diameter of the sheath 3 and is coaxial therewith. The neck 16 has two diametrically-opposed openings 17 forming part of a bayonet joint. At its upper part, the body part 14 includes a collar 18 which rests upon the grid 15 and, at its lower part, as shown in FIG. 3, two apertures formed in two opposite angles in which two pawls 19 are pivotally mounted on horizontal spindles 20. Below the apertures, the head of the assembly terminates in a rectangular flange 21 having four holes therein for receiving bolts 22 for securement to the fuel element can 23. The latter can comprise four stop members 24 for receiving a buffer for the fall of safety rods.

Figure 4:
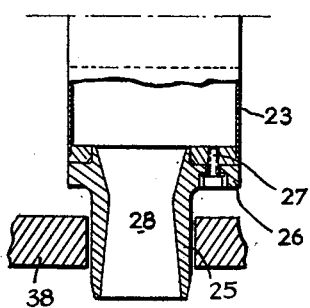
FIG. 4 shows the lower ferrule of the assembly in the same section plane as FIG. 1.

The foot of the fuel element assembly shown in section in FIG. 4 is constituted by a cylindrical ferrule 25 secured to the end of the can 23 by means of a rectangular flange 26, including four holes for receiving fixing screws 27. The ferrule 25 fits into a recess in the lower grid 38, with sufficient freedom to permit expansion to occur unhindered. On the other hand, the ferrule is machined internally as a convergent-divergent passageway 28, for obtaining good distribution of the primary fluid on entry into the assembly.

All the constituent parts of the device described above can be advantageously fabricated from stainless steel, though the use of this material is not limitative.

Figure 5:
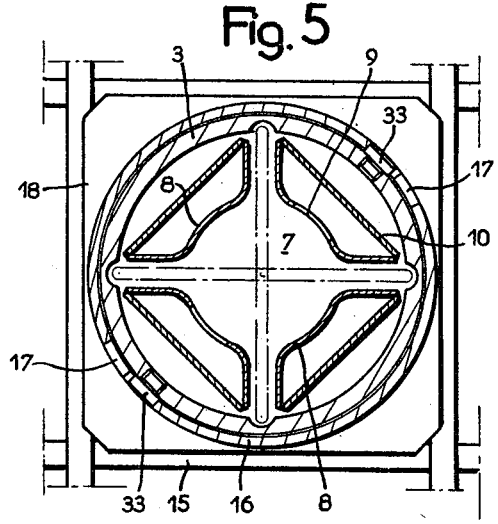
FIG. 5 shows a sectional view on the line D—D of FIG. 1.
Figure 6:
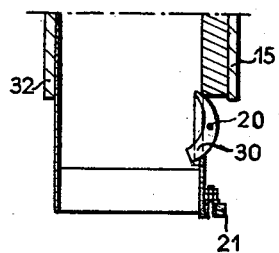
FIG. 6 shows a detail of the head of the assembly, showing a pawl in the inoperative position.

The procedure for loading the fuel and mounting it in the core is as follows: The fuel element assembly is introduced through the upper grid aperture until the collar 18 rests upon the upper edge 29 (FIG. 1) of the grid. At this time, the ferrule 25 has passed into the corresponding recess in the lower grid, which acts as a guide but not as an abutment. Manipulation can be effected by way of the apertures 17 in the head of the assembly or by means of lugs (not shown) which are located on the neck member 16. The pawls 19 are shaped so that their heads 30 are heavier than their tail portions 31; their natural position is thus with their heads downward and their tail portions in contact with the lower part of the machined bore of the body part 14, as shown in FIG. 6. When the sheath 3 of the guide tube is introduced into this bore, the annulus 13 pushes against the tail portions 31 of the pawls, which pivot until their heads 30 abut the lower edge 32 of the recess in the grid 15. At the same time, two projections 33 disposed on the sheath 3 below the shoulder 5 pass into the apertures 17 in the neck 16 and, after slight rotation, become jammed against the upper rims of the apertures under the action of a spring 34 (FIG. 1). The latter abuts the shoulder 5 of the sheath 3 at one end and the extremity 35 of the neck 16 at the other. FIGS. 1 and 5 illustrate the positions of the projections 33 when the guide tube is locked in the head of the fuel element assembly.

The coolant fluid circuit (pressurised) is as follows: Inlet occurs through the convergent-divergent passageway 28, the fluid then passing through the fuel elements, the head of the assembly and the guide tube and leaving via lateral orifices such as 36 or via the fin assembly 2.

It will be readily appreciated from the foregoing description that the mounting device of the invention provides numerous advantages:

(a) It can be used with any kind of fuel element assembly, including bars, plates or tubes, and assemblies of recttangular, hexagonal or circular cross-section;

(b) The assembly is rigidly held in the core, which allows it to withstand shock particularly well;

(c) Expansion occurs freely downwardly, without it being necessary to resort to the use of holding springs;

(d) Machining of the various parts can be considerably reduced because of the simplicity of operation;

(e) The use of the guide tube for locking the pawls increases the rigidity of the system and precludes use of a third grid, which would be required to hold the guide tube, giving maximum free volume between the cover of the tank and the core;

(f) Manipulation of the assemblies can be effected without dismantling other than removal of the cover of the tank.

What we claim is:

1. A mounting device for fuel element assemblies, a nuclear reactor, spaced upper and lower grids in said reactor, a fuel element assembly, a head for said fuel element assembly, a recess in said upper grid, said head being located in said recess, a collar member for said head forming an abutment, said head being of parallelopipedal shape in cross-section, a central bore in said head, apertures at the base of said head, a pawl in each of said apertures pivoted on a horizontal axis, a cylindrical guide tube for said assembly slidably mounted in said bore and engaging and rotating said pawls into contact with the lower edge of said upper grid, locking means between said head and said guide tube, a fuel element can secured at the base of said head, and a ferrule member secured to said fuel element can and freely slidable in said lower grid.

2. A device as described in claim 1, said head having the same cross-section as said fuel element can.

3. A device as described in claim 1, said head being rectangular in cross-section.

4. A device as described in claim 1 including lugs on said guide tube for manipulation thereof.

5. A device as described in claim 1, including a convergent-divergent conduit means in said ferrule member.

References Cited in the file of this patent

UNITED STATES PATENTS

| | | |
|---|---|---|
| 2,898,280 | Schultz | Aug. 4, 1959 |
| 2,969,311 | Wigner et al. | Jan. 24, 1961 |
| 3,000,728 | Long et al. | Sept. 19, 1961 |
| 3,039,949 | Newton et al. | June 19, 1962 |